L. Hull,
Working Whalebone.
Nº 14,612.  Patented Apr. 8, 1856.
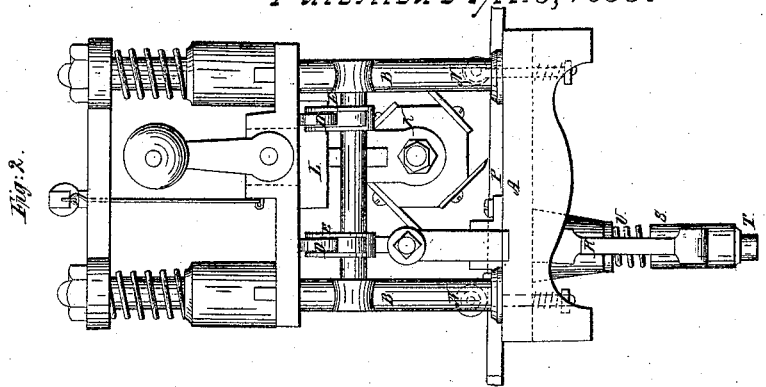
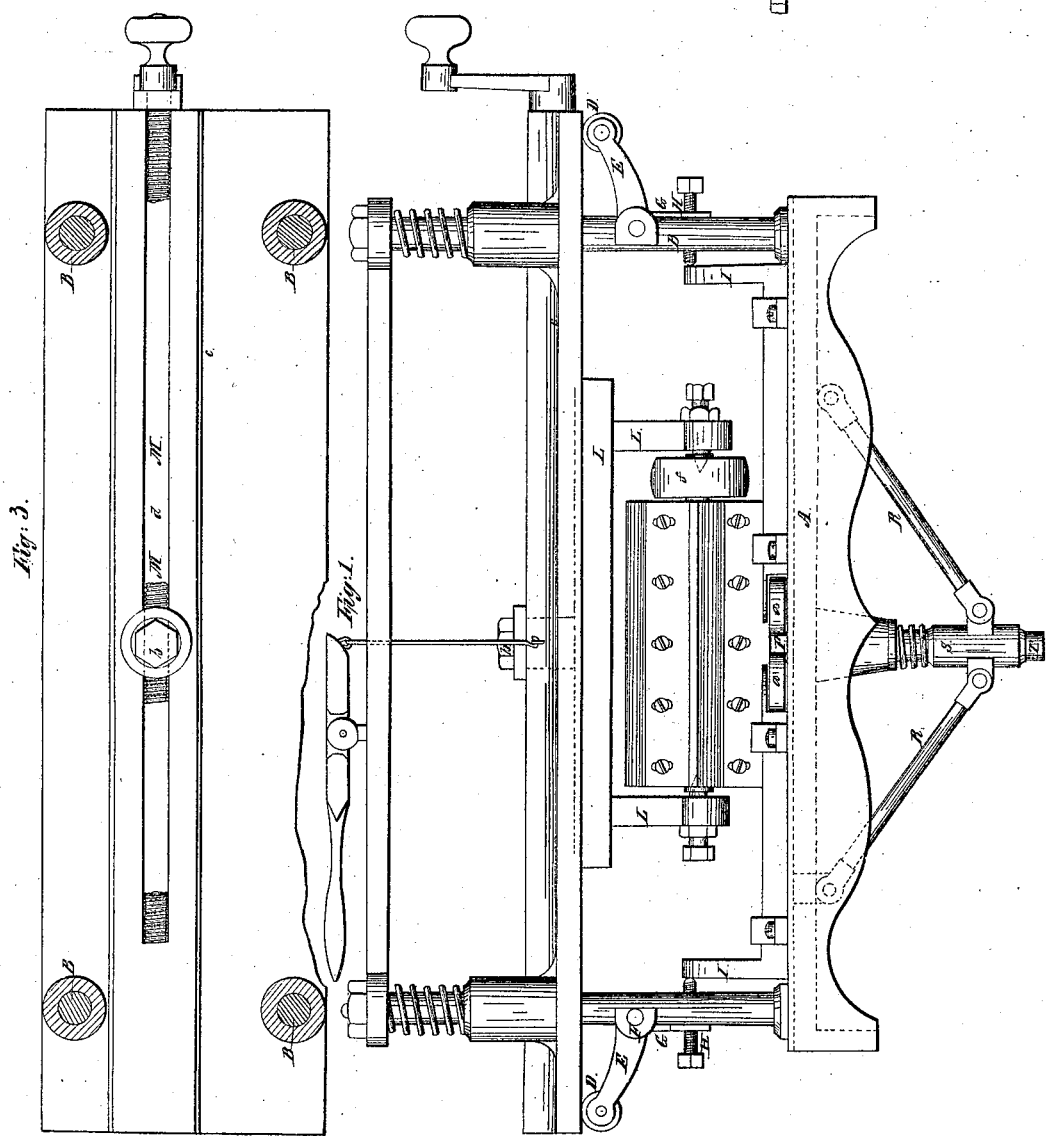

UNITED STATES PATENT OFFICE.

L. HULL, OF CHARLESTOWN, MASSACHUSETTS.

MACHINE FOR TAPERING WHALEBONE FOR WHIP-HANDLES.

Specification of Letters Patent No. 14,612, dated April 8, 1856.

*To all whom it may concern:*

Be it known that I, LIVERAS HULL, of Charlestown, in the county of Middlesex and State of Massachusetts, have invented a new and useful Machine for Dressing Tapering Strips of Whalebone for Whip-Handles; and I do hereby declare that the same is fully described and represented in the following specification and the accompanying drawings, letters, figures, and references thereof.

Of such drawings, Figure 1, is a front elevation and Fig. 2, an end view of the said machine.

In manufacturing whip stocks from a sheet of whalebone which gradually tapers or diminishes in thickness from one end to the other it is customary for such sheet to be split or rived into pieces of an exact or about an equal width, and one corresponding to the greatest thickness of the sheet. This imparts to each piece the shape of a wedge.

The object of my machine is to dress or reduce such piece on one edge so as to bring it to a pyramidal or frustopyramidal shape, in order that it may not only taper on two of its opposite sides, but also on the other two sides of it.

In the drawings, A, exhibits the bed plate or table of the machine extending from and above it are four posts B, B, each of them passing through a plate or frame C. The said plate, C, should not only slide freely on the posts and so that it may be moved either toward or away from the table A, but it should rest at each of its two ends on two rollers D, D, carried by arms E, E, that project from a horizontal rocker shaft F.

Extending downward from each of the rocker shafts, F, is an arm, G, through which a screw H passes and abuts against one of two slides or carriages I, I, arranged with respect to each other as seen in Fig. 1, and so applied to the bed A, as to be capable of sliding endwise thereon, each of said slides at its inner end being made to carry a friction roller, *a*, which when the machine is in operation bears against one of the two opposite tapering sides of the piece of whalebone represented at, P, in the drawings. Somewhat in front of the said rollers *a, a*, a cutter cylinder, K, is arranged as seen in Figs. 1, and, 2, and has a driving pulley, *f*, on its shaft, and such shaft or its journals sustained by a carriage or frame, L, which is so applied to the plate C, as to be capable of being moved endwise, either in one direction or the other by means of a screw M, which is tapped through a stud, *b*, which extends up from the cutter carriage and works in a slot, *d*, formed longitudinally through the plate, C, as seen in Fig. 3, which is a top view of said plate, C.

Spring pressure rollers, N, N, are disposed as seen in Fig. 2, and so as to press the piece of whalebone, P, down upon the bed A, while the cutter cylinder is in operation.

By means of joint rods R, R, the slides or carriages I, I, are connected to a tubular slide, S, which plays freely on a stationary, vertical rod, T, and is secured by a spring, U, arranged on the rod T as seen in the drawings.

Each arm, E, is about double the length of the arm G, of its shaft in order that the longitudinal movement of the carriages or slides, I, I, in receding from each other may cause the cutter cylinder to be raised in proportion to the increase of the distance between the rollers, *a, a*, of said carriages.

In using the machine, a wedged strip of whalebone is placed with its narrowest end between the rollers, *a, a*, and with one of its parallel sides resting on the bed, A. In this state of things, if the cutter cylinder is put in revolution and the strip of whalebone moved longitudinally between the rollers, *a, a*, it will not only be reduced on its upper edge by the cutter cylinder but it will gradually move the rollers apart so as to produce a corresponding elevation or movement of the cutter cylinder, and so as to cause such to reduce it, (the stick or piece of whalebone) to a tapering form, a transverse section of which, when taken in any part of it will be a square.

The spring, U, serves to insure the approach of the slides, I, I, after the piece of whalebone has been drawn out from between them. A spring, V, may be placed on each rod, B, in order to insure a corresponding downward movement of the plate, C, cylinder. By applying the cutter cylinder to the plate, C, by devices as above described, the former is rendered susceptible of being moved endwise for the purpose or in order that when its knives may have become dulled, the dulled parts may be moved simultaneous from over the whalebone, and put a sharp portion of the knives brought into action upon such, it being understood that the cutter cylinder is to be made of a length to allow of such.

As a general rule, the cutter cylinder may be made so that each of its cutting edges shall be of a length more than double the greatest width of any stick or piece of whalebone to be dressed by the machine.

What I claim as my invention is—

1. Combining with the cutter cylinder and the bed plate of the machine, mechanism, (substantially as described) to operate against and be operated by the sides of a stick of whalebone and so as to control or regulate the vertical movements of the rotary cutter cylinder, essentially as specified.

2. I also claim constructing the cutter cylinder, and combining it with the plate, C, in manner as described or by such devices as will enable it to be moved endwise for the purpose as specified.

In testimony whereof, I have hereunto set my signature this eleventh day of October, A. D. 1855.

LIVERAS HULL.

Witnesses:
R. H. EDDY,
F. P. HALE, Jr.